(12) United States Patent
Fujiwara

(10) Patent No.: US 9,223,191 B2
(45) Date of Patent: Dec. 29, 2015

(54) ATTACHMENT FOR STRAP

(71) Applicant: CANON KABUSHIKI KAISHA, Tokyo (JP)

(72) Inventor: Yuya Fujiwara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 63 days.

(21) Appl. No.: 13/898,817

(22) Filed: May 21, 2013

(65) Prior Publication Data
US 2013/0312232 A1 Nov. 28, 2013

(30) Foreign Application Priority Data

May 24, 2012 (JP) .................................. 2012-118129
May 24, 2012 (JP) .................................. 2012-118232

(51) Int. Cl.
*G03B 17/56* (2006.01)
(52) U.S. Cl.
CPC ............... *G03B 17/566* (2013.01); *Y10T 24/45* (2015.01)
(58) Field of Classification Search
CPC .. A45C 11/38; A45C 13/30; A45C 2003/007; A45C 2011/003; A45C 3/004; A45C 3/02; A45F 2200/0533; A45F 3/14; A45F 5/00; A45F 2200/0591; A45F 3/04; A45F 3/042; Y10S 224/908; Y10S 224/91; G10G 5/005; Y10T 16/525; Y10T 16/54029; Y10T 24/45754; G03B 17/566
USPC ....................................................... 24/265 R
See application file for complete search history.

(56) References Cited

U.S. PATENT DOCUMENTS

| | | | | |
|---|---|---|---|---|
| 3,583,042 A | * | 6/1971 | Ishizaka ....................... | 24/265 R |
| 3,741,092 A | * | 6/1973 | Bohanec ........................ | 224/257 |
| 3,777,639 A | * | 12/1973 | Lange ............................ | 396/541 |
| 3,790,209 A | * | 2/1974 | Littmann ....................... | 297/483 |
| 3,882,576 A | * | 5/1975 | Kanno ............................ | 24/658 |
| 4,291,822 A | * | 9/1981 | Simonds ........................ | 224/257 |

(Continued)

FOREIGN PATENT DOCUMENTS

| CN | 201356125 Y | 12/2009 |
|---|---|---|
| EP | 0947726 A2 | 10/1999 |

(Continued)

OTHER PUBLICATIONS

Aug. 5, 2015 Chinese Office Action, issued in Chinese Patent Application No. 201310196699.9.

*Primary Examiner* — Robert J Sandy
*Assistant Examiner* — David Upchurch
(74) *Attorney, Agent, or Firm* — Cowan, Liebowitz & Latman, P.C.

(57) ABSTRACT

An attachment for strap detachable from a strap mount includes a plate having a strap hole formed portion, a strap mount connecting portion, and a cranked portion connecting the strap hole formed portion with the strap mount connecting portion, and a rotating member that has an extension portion and that is rotatably supported by the strap hole formed portion. Each of the strap mount connecting portion and the cranked portion is provided with a connecting hole so as to attach the strap mount. And the rotating member is rotatable between a first position where the extension portion passing through the connecting hole abuts against the strap mount so as to set the attachment for strap to be in a locked state and a second position where the extension portion is removed from the connecting hole so as to set the attachment for strap in an unlocked state.

5 Claims, 12 Drawing Sheets

(56) References Cited

U.S. PATENT DOCUMENTS

| | | | |
|---|---|---|---|
| 4,370,040 A * | 1/1983 | Lange | 396/420 |
| 4,915,413 A * | 4/1990 | Meyer | 280/801.1 |
| 5,149,136 A | 9/1992 | Maekawa et al. | |
| 5,403,038 A * | 4/1995 | McFalls | 280/808 |
| 7,007,352 B1 * | 3/2006 | Hill | 24/522 |
| 2005/0071962 A1 * | 4/2005 | Bergkvist | 24/615 |
| 2005/0199662 A1 * | 9/2005 | Rekuc | 224/264 |
| 2006/0074379 A1 * | 4/2006 | Hunt | 604/74 |
| 2008/0237250 A1 * | 10/2008 | Swansey | 220/756 |

FOREIGN PATENT DOCUMENTS

| | | |
|---|---|---|
| JP | 09-140439 A | 6/1997 |
| JP | 09-240426 A | 9/1997 |

* cited by examiner

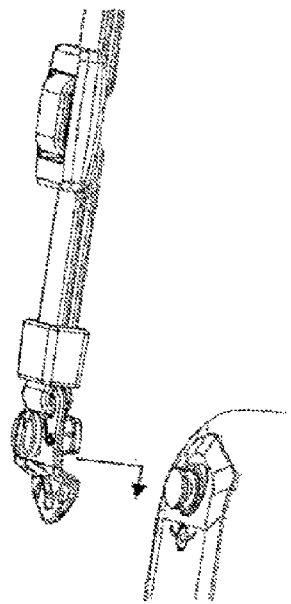
FIG. 8
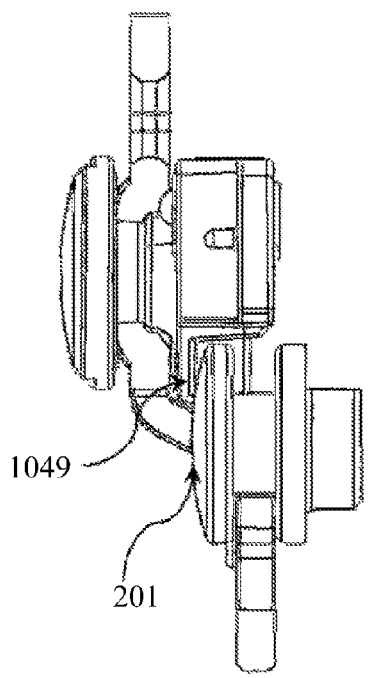 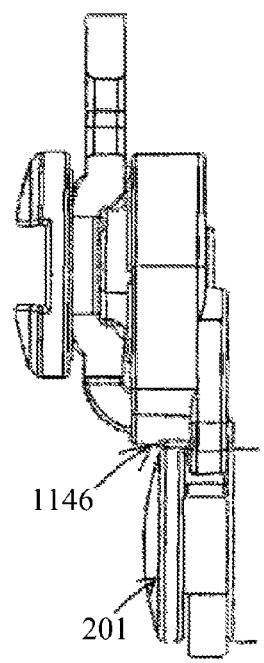
FIG. 9A          FIG. 9B

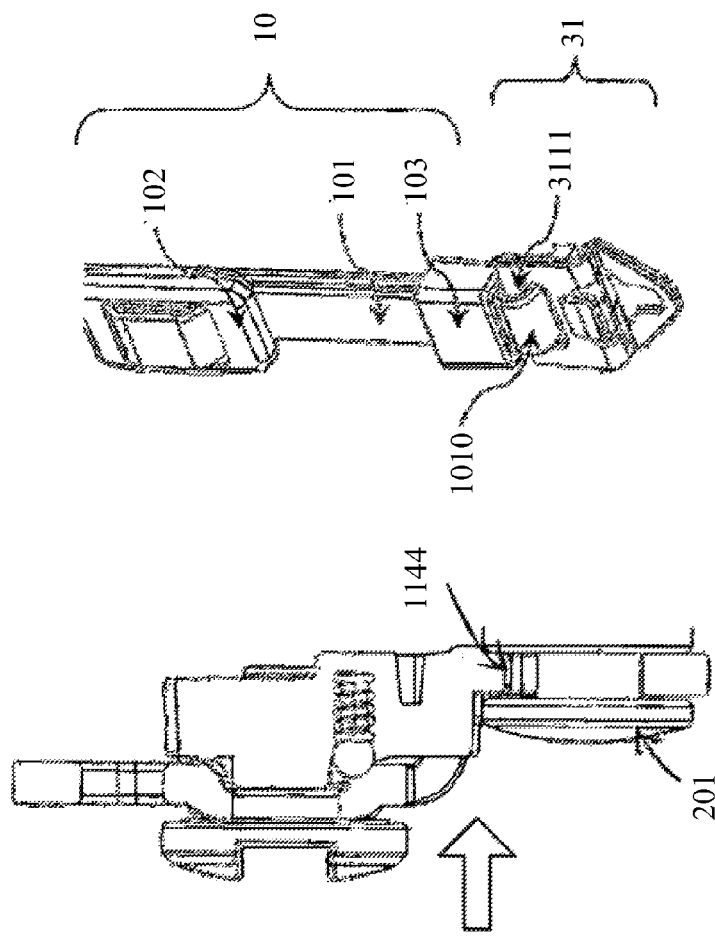
FIG. 11
FIG. 12
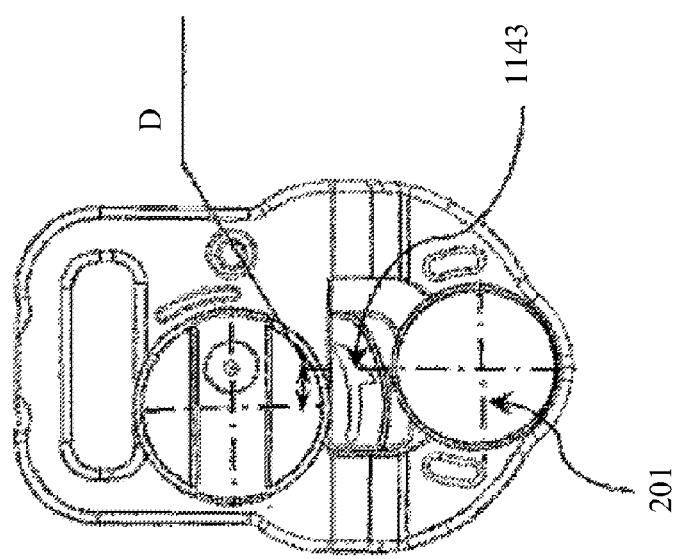
FIG. 10

ATTACHMENT FOR STRAP

BACKGROUND OF THE INVENTION

1. Field of the Invention

The present invention relates to an attachment for strap detachable a strap from a portable such as a camera.

2. Description of the Related Art

A portable such as a camera where a strap belt such as a shoulder belt is detachably attached is carried so as to be easy to carry around.

For example, attachments for strap having a long hole of rectangle shape are fixed to an upper part of both sides of general camera body. A first side of a strap belt inserts into a long hole of one attachment, passes through a binging ring so as to bring together the top of the strap belt, and is fixed by passing through a buckle member. Similarly, a second side of the strap belt is attached to the other attachment so as to use the strap belt as double-hung shoulder belt. Additionally, the strap belt is detached in order of the buckle member, the binging ring contrary to the attachment operation.

However, an operation of an attachment mechanism of a strap of a general camera has a problem to take a lot of trouble because the strap belt is inserted and removed from both the buckle member and the binging ring at the time of the attachment and the detachment of the strap belt.

To resolve the problem, in Japanese-Patent Laid-Open No. 9-140439, an attachment for strap capable of detaching a strap from a strap mount having a head portion and an axis portion which protrude from a camera body by a simple method is disclosed. The attachment for strap disclosed in Japanese-Patent Laid-Open No. 9-140439 includes a plate where the strap belt is attached and a rotating body rotatably supported on the plate by the supporting part. A small diameter hole which is corresponding to the axis portion of the strap mount and is smaller than the head portion and a large diameter hole which is successive from the small diameter hole and is inserted into the head portion of the strap mounts are formed on the plate and the rotating body. Additionally, the rotating body is rotatably supported centering on the small diameter hole of the plate.

When the attachment for strap is attached to the camera body, the strap mount of the camera body penetrates to the hole of the attachment for strap where both holes of the plate and the rotating body accord by the above configuration. Afterward, the attachment for strap is attachable to the strap mount of the camera body by rotating the rotating body and shifting the head diameter holes each other. As a result, easily detachment can be achieved compared to the attachment mechanism of general camera.

However, there is a problem that the protrusion of the strap mount is large since the attachment for strap disclosed in Japanese-Patent Laid-Open No. 9-140439 is attached to the strap mount of the camera body in a state where both the plate and the rotating body overlap each other. Since the length of the axis portion of the strap mount need at least both thickness of the plate and the rotating body, the length of the axis portion of the strap mount becomes large, and as a result, the protrusion of the strap mount becomes large. It is necessary to make the protrusion of the strap mount small as possible since a grip performance decreases and stable shooting is difficult if the protrusion portion of the attachment for strap is large in the camera especially.

SUMMARY OF THE INVENTION

The present invention provides an attachment for strap which is able to make a protrusion of a camera body small and is easy to operate detachment despite small size.

An attachment for strap detachable from a strap mount having a head portion and an axis portion as one aspect of the present invention includes a plate having a strap hole formed portion, a strap mount connecting portion, and a cranked portion connecting the strap hole formed portion with the strap mount connecting portion, the cranked portion intersecting with the strap hole formed portion and the strap mount connecting portion, and a rotating member that has an extension portion extending at one end of the rotating member and that is rotatably supported by the strap hole formed portion. Each of the strap mount connecting portion and the cranked portion is provided with a connecting hole so as to attach the strap mount. And the rotating member is rotatable between a first position where the extension portion passing through the connecting hole abuts against the head portion of the strap mount so as to set the attachment for strap to be in a locked state and a second position where the extension portion is removed from the connecting hole so as to set the attachment for strap in an unlocked state.

An attachment for strap detachable from a strap mount having a head portion and an axis portion as another aspect of the present invention includes a plate having a strap hole formed portion, a strap mount connecting portion, and a cranked portion connecting the strap hole formed portion with the strap mount connecting portion, the cranked portion intersecting with the strap hole formed portion and the strap mount connecting portion, and a leaf spring member a first end of which is attached to the strap hole formed portion, and capable of moving between the strap mount connecting portion and the strap hole formed portion by elastic deformation. Each of the strap mount connecting portion and the cranked portion is provided with a connecting hole so as to attach the strap mount. An abutment portion protruding from the connecting hole is formed on a second end of the leaf spring member. And the abutment portion moves between a first position where the abutment portion abuts against the head portion of the strap mount so as to set the attachment for strap to be in a locked state and a second position where the abutment portion elastically deforms from the first position to the strap hole formed portion so as to set the attachment for strap to be in a unlocked state.

Further features of the present invention will become apparent from the following description of exemplary embodiments with reference to the attached drawings.

BRIEF DESCRIPTION OF THE DRAWINGS

FIG. 8 is a perspective view of illustrating the camera where the strap unit is attached.

FIGS. 9A and 9B are sectional views of illustrating positional relations of the attachment for strap and the strap mount.

FIG. 10 is a front view of the attachment for strap that is the locked state and the strap mount.

FIG. 11 is a sectional view of illustrating positional relations of the attachment for strap and the strap mount.

FIG. 12 is a perspective view of a strap unit of Embodiment 2.

DESCRIPTION OF THE PREFERRED EMBODIMENTS

Figure 1:
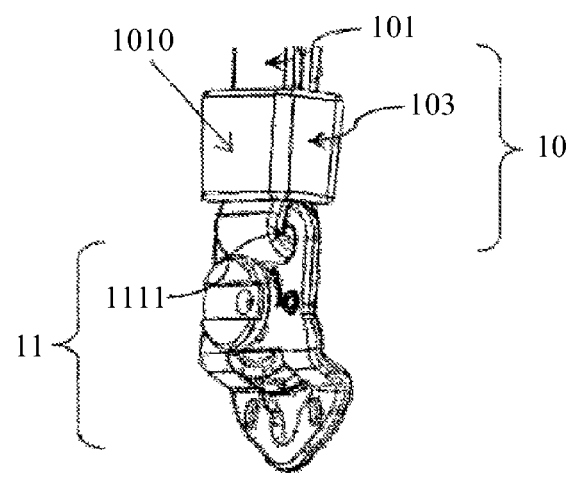
FIG. 1 is a perspective view of a strap unit of Embodiment 1.

Exemplary embodiments of the present invention will be described below with reference to the accompanied drawings. In each of the drawings, the same elements will be denoted by the same reference numerals and the duplicate descriptions thereof will be omitted.

Embodiment 1

Figure 2:
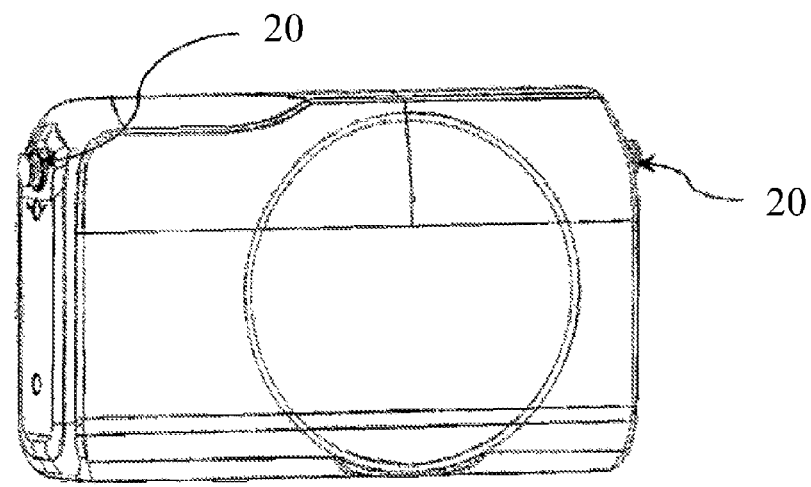
FIG. 2 is an overall view of a camera where the strap unit is attached.
Figure 3D:
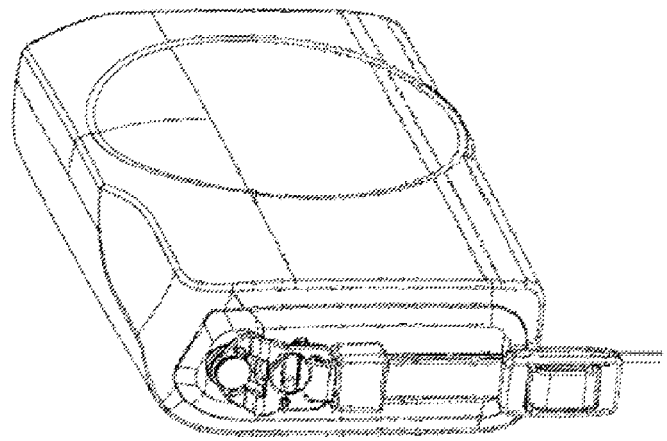
FIGS. 3A to 3D are overall views of the camera where the strap unit is attached.
Figure 3C:
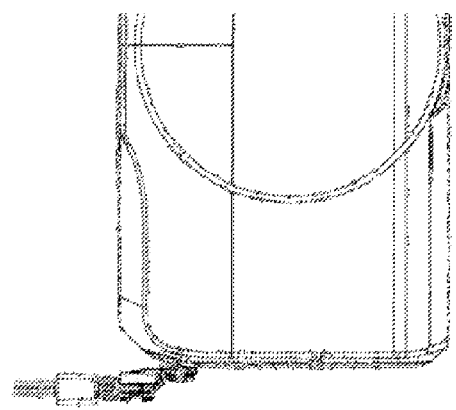
Figure 3B:
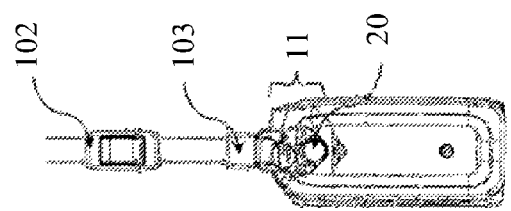
Figure 3A:
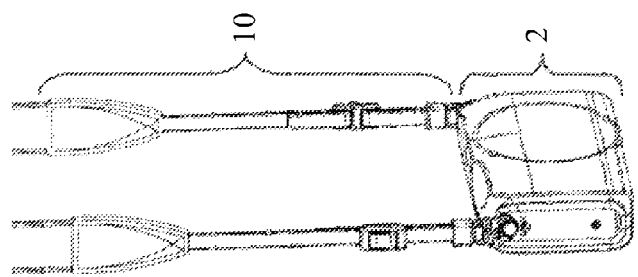

FIG. 1 is a perspective view of a strap unit of Embodiment 1, FIG. 2 is an overall view of a camera where the strap unit is attached, and FIGS. 3A to 3D are overall views of the camera where the strap unit is attached. FIG. 3A is a perspective view, FIG. 3B is a side view, FIG. 3C is a front view, and FIG. 3D is a perspective view of the state where the strap unit rotates from the state of FIG. 3A.

The strap unit includes a strap belt 10 and an attachment for strap (hereinafter referred to as "an attachment") 11 which is detachable from a strap mount 20 provided on side surfaces of a camera 2 and is attached to the strap belt 10. A belt 101 is inserted into a long hole 1111 provided on an upper part of the attachment 11, passes through a binging ring 103 so as to bring together the top of the strap belt 10 and is fixed by passing through a buckle member 102 so that the strap belt 10 is attached to the attachment 11.

Figure 4:
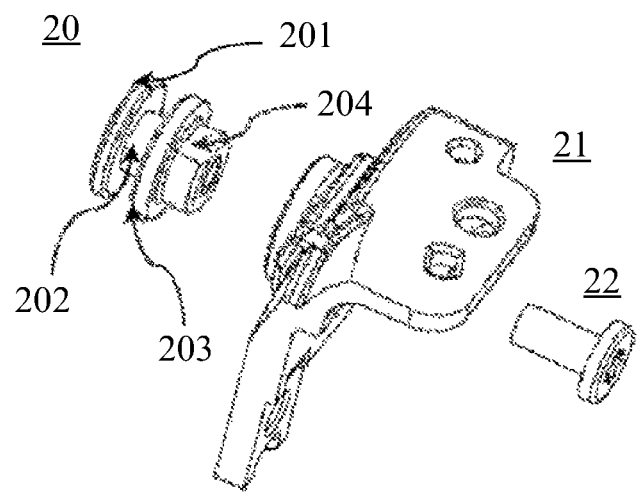
FIG. 4 is an exploded perspective view of a strap mount connecting portion provided in the camera.

FIG. 4 is an exploded perspective view of a strap mount connecting portion provided in the camera 2. The strap mount connecting portion includes a strap mount 20 exposed from the camera 2, a base member 21 that couples the strap mount 20 with the camera 2, and a screw 22 that fastens the strap mount 20 to the base member 21.

The strap mount 20 includes a head portion 201, an axis portion 202, a seating surface 203 and an attachment portion 204. The center of the attachment portion 204 is threaded a female screw and a first end thereof is cut in D-cut so as to stop the rotation. The attachment portion 204 of the strap mount 20 is inserted into a concave portion corresponding to the base member 21, and is fastened from the back side by the screw 22 through the base member 21. Therefore, the base member 21 is strongly fixed to the camera 2, and the strap mount 20 exposed from the camera 2 is also strongly fixed to the camera 2.

Thus, the shape of the strap mount 20 can be simple shape since the strap mount 20 and the base member 21 are another member, and the strap mount 20 is fixed to the camera 2 through the base member 21. As the shape of the strap mount 20 can become simple, the material of the strap mount 20 is easy to form by solid metal such as stainless steel. It is hard to scar the configuration of this embodiment even if the strap mount 20 slides on the plate of the strap unit because the strap mount 20 is formed by cutting stainless metal. The base member 21 is made of zinc die-cast that is relatively-weaker than stainless steel but is easy to machine.

Figure 5A:
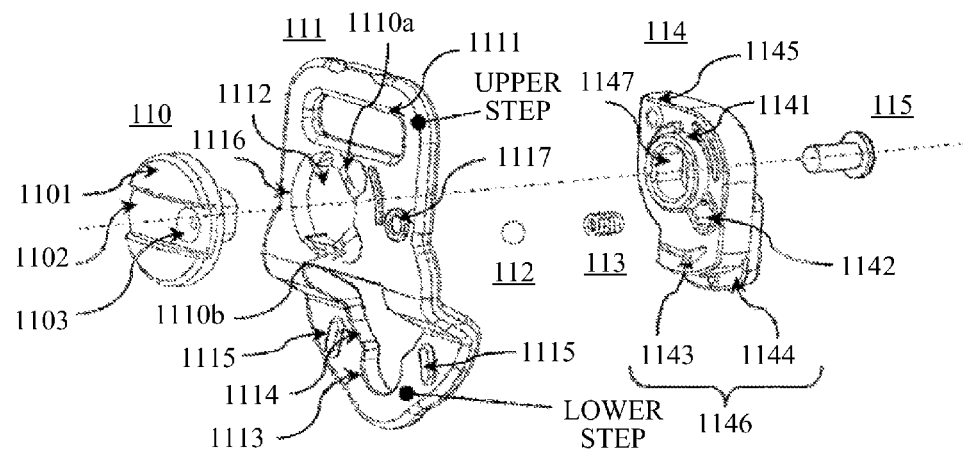
FIGS. 5A and 5B are exploded perspective views of an attachment for strap.
Figure 5B:
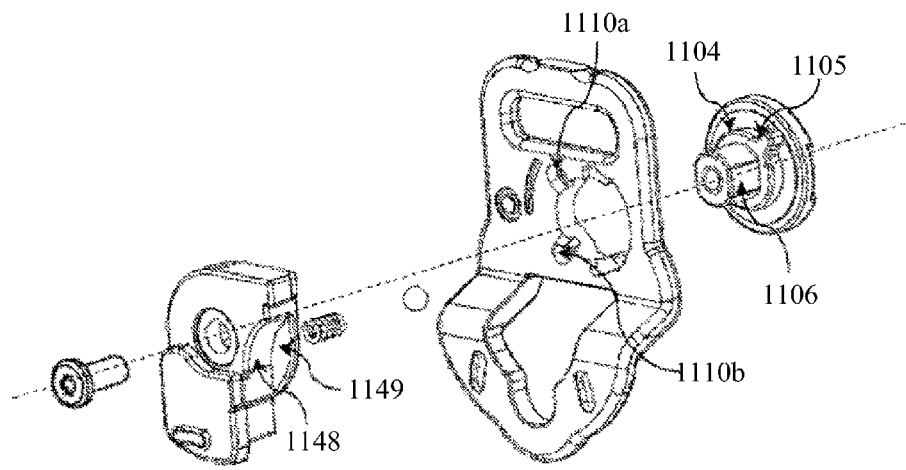

Next, the attachment 11 is described. FIGS. 5A and 5B are exploded perspective views of the attachment 11, FIG. 5A is a perspective view from a front surface side, and FIG. 5B is a perspective view from a back surface side.

In this embodiment, the front surface is a surface being apparent from the camera 2 when the strap unit is attached to the strap mount 20 of the camera 2, and the back surface is the opposite surface of the front surface.

The attachment 11 includes an operation member 110, a base plate (a plate) 111, a ball 112, a spring (an urging member) 113, a rotating member 114, and a fastening screw 115. The base plate 111 and the operation member 110 are made of metal such as stainless metal, and the rotating member 114 is made of mold member such as polyoxymethylene (POM) with a high sliding characteristic.

The attachment 11 of this embodiment is built according to the following procedure.

First, after the spring 113 and the ball 112 so as to generate the click power of the operation are inserted into a hole 1142 provided on the rotating member 114, a rotating axis portion 1141 of the rotating member 114 is inserted into an opening portion 1112 of the base plate 111.

Next, the operation member 110 is inserted into an opening portion 1147 of the rotating member 114, and the operation member 110 and the rotating member 114 are fastened by the fastening screw 115. As a result, the base plate 111 is placed between the operation member 110 and the rotating member 114. In this embodiment, the operation member 110 along with the rotating member 114 can rotate 90 degrees relative to the base plate 111.

When the base plate 111 of this embodiment is seen from the side surface, the base plate 111 is crank shape where an upper step and a lower step thereof are parallel. In this embodiment, a lower step portion (a strap mount connecting surface) is a side closing with the camera 2 and an upper step portion (a strap hole formed surface) is a side being apart from the camera 2 when the attachment 11 is attached to the camera 2. Additionally, a cranked portion that intersects with both the upper step portion and the lower step portion and connects the upper step portion with the lower step portion is formed on the base plate 111. The cranked portion connects the upper step portion with the lower step portion so that a length from inside of the upper step portion to outside of the lower step portion is longer than a length from the seating surface 203 to the top of the head portion 201.

As shown in FIG. 1, after insertion of the belt 101 into the long hole 1111 of the base plate 111, the belt 101 needs to be folded 180 degrees so as to attach the belt 101 to the base plate 111. Thus, a tumor 1010 is generated by a fold which is an attachment portion of the belt 101 around the long hole 1111. However, since the sectional view of the base plate 111 is crank shape, the tumor 1010 of a fold fits inside the scale from inside of the upper step portion to outside of the lower step portion in the base plate 111.

As shown in FIG. 3D, the fold of the belt 101 does not interfere with the camera 2 even if the attachment 11 rotates 180 degrees.

A connecting hole for insertion of the strap mount 20 of the camera 2 is formed on the lower step portion of the base plate 111. The connecting hole includes a small diameter hole 1113 corresponding to the axis portion 202 of the strap mount 20 and a large diameter hole 1114 for insertion of the head portion 201. The large diameter hole 1114 connects to the small diameter hole 1113 and extends to the cranked portion.

A big moment acts on the lower step portion of the base plate 111 by the principle of the leverage being the strap mount 20 as a pivot point when heavy load is applied near the long hole 1111 so as to attach the strap unit of this embodiment to the camera 2. Then, the intensity of the lower step portion especially increases by providing a half blanking 1115 around the small diameter hole 1113.

The operation member 110 and the rotating member 114 are rotatably hold on the upper step portion of the base plate 111, and the opening portion 1112 being the rotating center of the operation member 110 and the rotating member 114 is formed on the upper step portion of the base plate 111. An opening expanded portion 1116 expanding a part in a radial direction thereof is formed on the opening portion 1112. A convex portion by half blanking is formed on the upper and the lower portion of the opening expanded portion 1116.

Additionally, a pair of half blanking shapes 1110a and 1110b whose position are shifted by 90 degrees are formed around the opening portion 1112. The pair of the half blanking shapes 1110a, 1110b are formed so as to become the operation member 110 side as convex shape and so as to become the rotating member 114 side as concave shape.

The convex portion formed on the operation member 110 side of the pair of the half blanking shapes 1110a and 1110b makes a sliding surface with the operation member 110. Therefore, friction force generating by the operation of the operating member 110 decreases, and the operability is well since the sliding surface of the base plate 111 and the operation member 110 is not wide and is formed at the top of the pair of the half blanking shapes 1110a and 1110b.

The concave portion of the rotating member 114 side of the pair of the half blanking shapes 1110a and 1110b is a part of the click mechanism of the attachment 11 with the ball 112 and the spring 113.

Since the spring 113 is compressed between the rotating member 114 and the base plate 111, the length of the spring 113 at concave shape position of the pair of the half blanking shapes 1110a and 1110b becomes longer than the length at other positions. Therefore, reaction force by the spring 113 becomes small at the concave shape position of the pair of the half blanking shapes 1110a and 1110b, and click force generates.

Since the pair of the half blanking shapes 1110a and 1110b play another roles at the operation member 110 side and the rotating member 114 side, the shape provided on the base plate 111 can be simple, as a result, it is possible to reduce costs by decreasing processing man hour and to become miniaturization of the attachment 11.

A large diameter head portion 1101, medium diameter axis portion 1104, and a small diameter axis portion 1106 for fixing are formed on the operation member 110.

A slit 1102 capable of inserting general coin and a mark 1103 are formed on the surface side of the large diameter head portion 1101. Here, for example, it is possible to operate by inserting convex shape which is capable of engaging with the slit 1102 and is formed on the buckle member 102 of the strap belt and a part of the binging ring 103 into the slit 1102 instead of a coin.

The medium diameter axis portion 1104 is a little smaller than the diameter of the opening portion 1112 being the rotating center of the base plate 111. Additionally, a stopper 1105 radially extending is formed on a part of the medium diameter axis portion 1104. The small diameter axis portion 1106 for fixing becomes D shape so as to position the rotating member 114.

The stopper 1105 works as a stopper for opening and closing by facing the end portion of the opening expanded portion 1116 adjacent to the opening portion 1112 of the base plate 111 at each position of the locked state and the unlocked state of the attachment 11 described below.

Therefore, the destroy of the D shape for positioning of the operation member 110 and the rotating member 114 does not generate by dispersing load on the stopper 1105 if heavy torque is applied to the operation member 110 for operation with a coin by users.

A part of the rotating member 114 becomes cam shape radially extending from the center of the rotating, and the rotating member 114 is supported so as to be rotatable with respect to the base plate 111 along with the operation member 110.

The diameter of the rotating axis portion 1141 is a bit smaller than that of the opening portion 1112 being the rotating center of the base plate 111, and the rotating axis portion 1141 has cylindrically-shape, which has the opening portion 1147 at the center. The opening portion 1147 is D shape corresponding to the a small diameter axis portion 1106 of the operation member 110 so as to decide the positions of the operation member 110 and the rotating member 114.

Additionally, the rotating member 114 has a hole 1142 which is formed on the position radially shifted from the rotating center and houses the spring 113 and the ball 112, and a lock portion (extension portion) 1146 whose end radially extends from the rotating center.

A mark 1143 showing the rotation direction is formed on the lock portion 1146. Additionally, a protruding portion 1144 is formed on a part of the lock portion 1146. The protruding portion 1144 is formed slightly thinner than the space between the head portion 201 and the seating surface 203. Further, a concave portion 1148 and a flange 1149 shifted 90 degrees from the lock portion 1146 are formed on the rotating member 114.

Figure 6C:
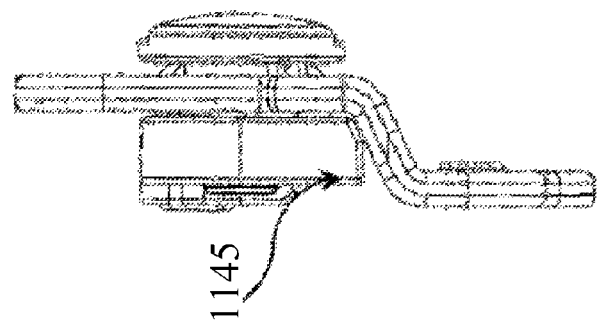
FIGS. 6A to 6C are external views of the attachment for strap that is an unlocked state.
Figure 6B:
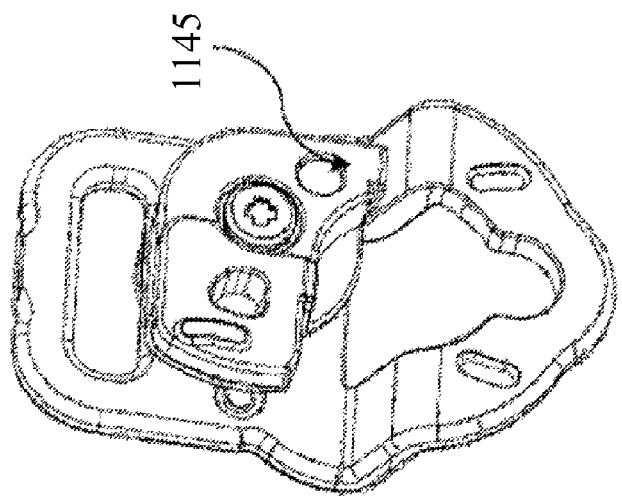
Figure 6A:
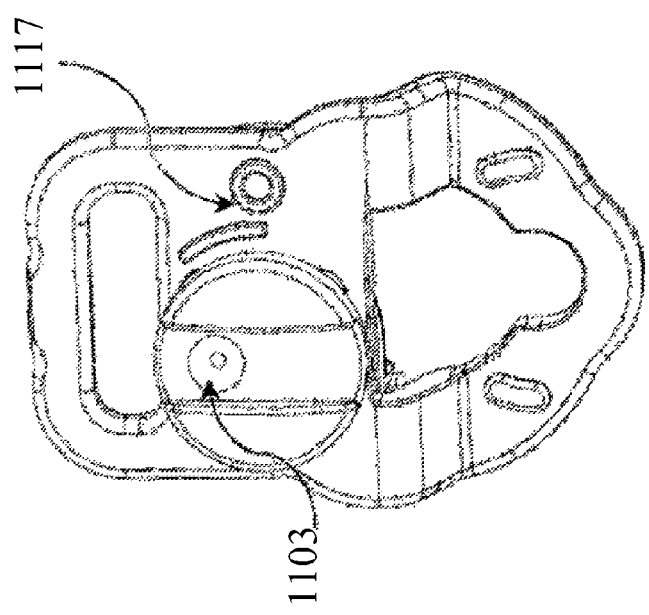
Figure 7A:
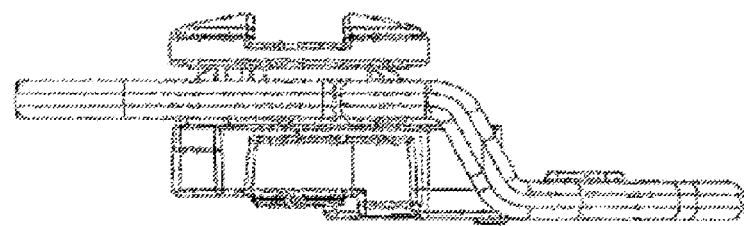
FIGS. 7A to 7C are external views of the attachment for strap that is a locked state.
Figure 7B:
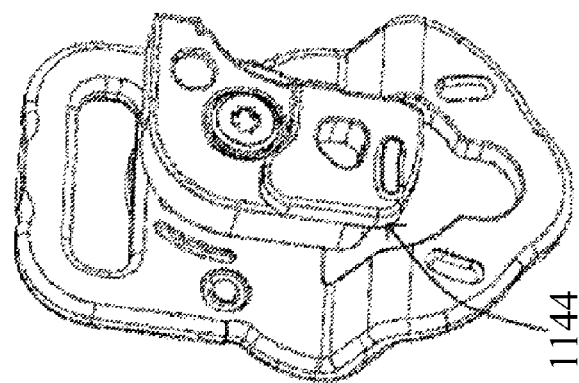
Figure 7C:
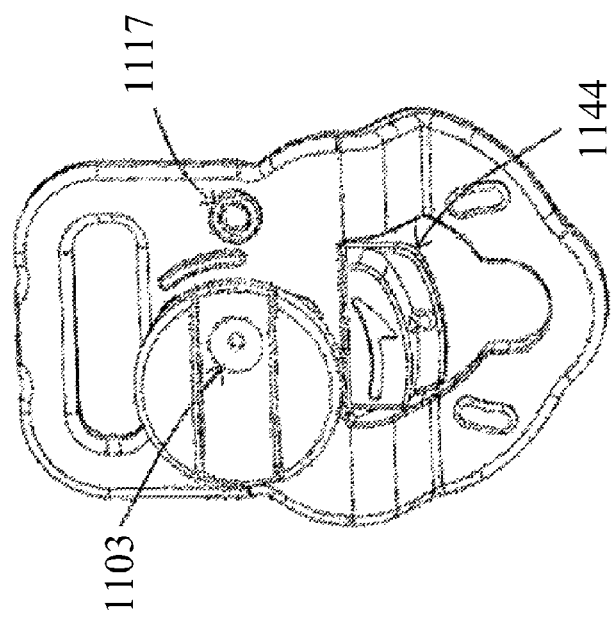

FIGS. 6A to 6C are external views of the attachment 11 that is unlocked state, and FIGS. 7A to 7C are external views of the attachment 11 that is locked state. FIGS. 6A and 7A are perspective views seen from the front surface side, FIGS. 6B and 7B are perspective views seen from the back surface side, and FIGS. 6C and 7C are side views.

The operation member 110 and the rotating member 114 rotate with respect to the base plate 111 when user engages a coin with the slit 1102 of the operating member 110 and operates the operation member 110. Then, the rotating member 114 rotates between a first position where the rotating member 114 becomes the locked state (FIGS. 7A to 7C) with respect to the strap mount 20 and a second position where the rotating member 114 becomes the unlocked state (FIGS. 6A to 6C) with respect to the strap mount 20.

Since the rotation range of the operation member 110 is restricted to 90 degrees by the stopper 1105, the rotation range of the rotating member 114 is also restricted to 90 degrees as well as the rotation range of the operation member 110.

The lock portion 1146 further comes close to the belt 101 side from the state shown in FIGS. 6A to 6C if the rotation range is not restricted, and the rotating member 114 rotates more than 90 degrees. Therefore, the rotating member 114 contacts with the tumor of the belt 101.

It is possible to miniaturize the attachment 11 since the operation range of the lock portion 1146 which needs the widest space in a trace can be small by restricting the rotation range of the rotating member 114 within 90 degrees in the attachment 11 of the present embodiment.

Next, the method for attaching the attachment 11 to the strap mount 20 is described.

FIG. 8 is a perspective view of illustrating the camera 2 where is the strap unit is attached, and FIGS. 9A and 9B are sectional views of illustrating positional relations of the attachment 11 and the strap mount 20. Additionally, FIG. 10 is a front view of the attachment 11 that is the locked state and the strap mount 20, and FIG. 11 is a sectional view of illustrating positional relations of the attachment 11 and the strap mount 20.

When the attachment 11 is attached to the strap mount 20, user firstly operates the operation member 110 and the attachment 11 become the unlocked state by evaluating the lock portion 1146 from the attachment hole of the base plate 111. Additionally, this operation direction of the operation member 110 is defined as a second direction.

If the operation member 110 is further rotates in the second direction from the unlocked state, a convex portion 1145 which is an end of the rotating member 114 faces to the connecting surface connecting the upper step portion of the base plate 111 with the lower step portion of the base plate 111 as shown in FIG. 6C.

Next, the attachment 11 is inserted into the strap mount 20 as a trace shown in an arrow of FIG. 8. Then, the head portion 201 of the strap mount 20 passes through the large diameter hole 1114 of the base plate 111, and is horizontally moved in a state where the head portion 201 faces the flange 1149 of the rotating member 114. This state is a state shown in FIG. 9A.

Then, the head portion made of metal does not directly contact with the base plate 111 made of metal by facing the head portion 201 with the flange 1149 so as to prevent the scratch to the head portion 201.

After, the attachment 11 is moved in down direction. At this time, the axis portion 202 of the strap mount 20 inserts into the small diameter hole 1113 of the base plate 111, and the base plate 111 is clipped between the head portion 201 and the seating surface 203.

When the operation member 110 rotates 90 degrees in a first direction opposite to the second direction under such a condition, the lock portion 1146 of the rotating member 114 engages with the head portion 201 of the strap mount 20 and the attachment 11 becomes the locked state. This state is a state shown in FIG. 9B.

If the operation member 110 is further rotates in the first direction from the locked state, a side surface of the protruding portion 1144 which is a part of the lock portion 1146 faces the end of the large diameter hole 1114 of the base plate 111 as shown in FIG. 7B.

When the rotating torque that rotates the operation member 110 is constant, the stress increases near the rotating center by the principle of the leverage. The small diameter axis portion 1106 which decides on the positioning of the operation member 110 and the rotating member 114 is positioned near the rotation center. Therefore, when the periphery of the rotating member 114, especially the lock portion 1146 is applied to an external force such as a shock, the small diameter axis portion 1106 of the operation member 110 which decides the positioning of the operation member 110 and the rotating member 114 is destroyed by gigantic load. As a result, the attachment 11 cannot operate the predetermined operation since the position of the operation member 110 and the rotating member 114 is shifted.

The end of the rotating member 114 faces the part of the base plate 111 even in both the state of the lock and the unlocked state in this embodiment. Therefore, if the external force is applied to the top of the rotating member 114, destroy of the small diameter axis portion 1106 does not generate by dispersing load on the stopper of the base plate 111.

In this embodiment, the rotation center position of the rotating member 114 offsets only distance D from the rotation center position of the attachment 11 as shown in FIG. 10. The rotation center of the attachment 11 is poisoned on the center line which connects the center position the small diameter hole 1113 with the center position of the large diameter hole 1114. Therefore, the rotation center position of the rotating member 114 is set to the position shifted the center line which connects the center position the small diameter hole 1113 with the center position of the large diameter hole 1114. Thus, the lock portion 1146 can rotate 90 degrees without interfering with the base plate 111 and also abuts the end surface of the large diameter hole 1114 of the base plate 111 which is close to the rotation center position of the rotating member 114.

Moreover, if the attachment 11 is push down, the strap mount 20 applies the component force which operates in a close direction to the lock portion 1146 and the rotating member 114 is not moved from the locked state to the unlocked state by unconsidered operating.

As a result, the reliable detachment mechanism capable of preventing the attachment 11 from moving from the locked state to the unlocked state without user's intendment is achieved.

Additionally, the mark 1143 which shows the rotation direction in the locked state is checked from the large diameter hole 1114 inserted the head portion 201 of the strap mount 20 as shown in FIG. 10. The rotating member 114 rotates in a direction of the arrow of the mark 1143 when the rotating member 114 moves to the unlocked state. In the unlocked state, the mark 1143 hinds in the base plate 111. Therefore, when the rotating member 114 rotates in a direction opposite to the direction of the arrow of the mark 1143 so as to move from the unlocked state to the locked state, the rotation direction of the operation member 110 is correctly able to be passed along user by hiding the arrow mark which shows a different direction.

Further, a mark 1117 is formed on the range made by offset of the opening portion 1112 being the rotation center on the base plate 111 in this embodiment. Therefore, user can check whether the attachment 11 is detachable or not by using the mark 1117 and the mark 1103 formed on the operation member 110. Thus, the state where the mark 1117 shifts 90 degrees from the mark 1103 shows the unlocked state as shown in FIGS. 6A to 6C, and the state where both the mark 1117 and the mark 1103 are positioned on a normal line with respect to the rotation axis of the operation member 110 shows the locked state as shown in FIGS. 7A to 7C.

Additionally, the space between the head portion 201 and the seating surface 203 is set so as to be easily able to correspond to maximum thickness of the base plate 111 in view of the thickness variability of the base plate 111.

Therefore, the space exists between the base plate 111 and the strap mount 20 when the attachment 11 is attached to the strap mount 20. Since both the base plate 111 and the strap mount 20 are made of metal material, contact sound of metal on metal generates. As recent camera has a mike (not shown) so as to record sound in video shooting, there is a worry that contact sound is recorded by the mike.

When the attachment 11 is attached to the strap mount 20, the protruding portion 1144 charges into the space between the head portion 201 and the seating surface 203 and is arranged as shown in FIG. 11 in this embodiment.

Then, the protruding portion 1144 is applied with a force towards the seating surface 203 side of the strap mount 20 in an attachment direction (the arrow direction of FIG. 11) by reaction force of the spring 113. Therefore, the protruding portion 1144 can abut the seating surface 203 without space. Hence, it is possible to moderate contact sound of the base plate 111 and the strap mount 20.

Additionally, thickness of the protruding portion 1144 may be set so as to lightly press-fit the protruding portion 1144 between the head portion 201 and the seating surface 203 by using elasticity of the protruding portion 1144 made of resin material. In this case, the contact sound is further moderated.

Embodiment 2

Figure 13D:
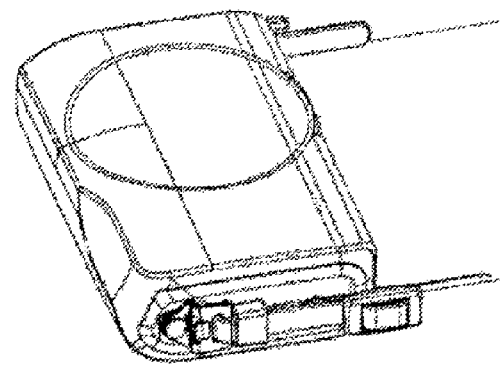
FIGS. 13A to 13D are overall views of a camera where the strap unit is attached.
Figure 13C:
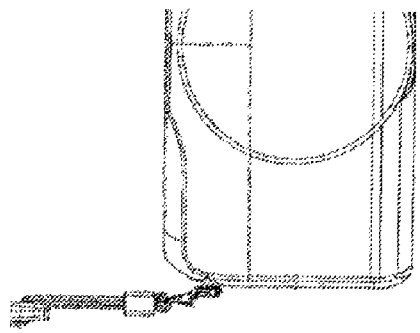
Figure 13B:
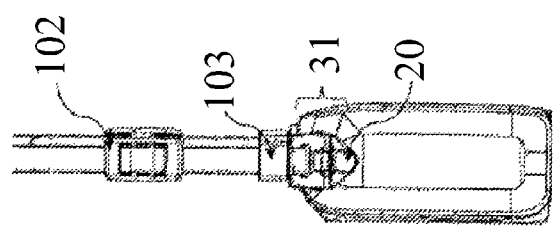
Figure 13A:
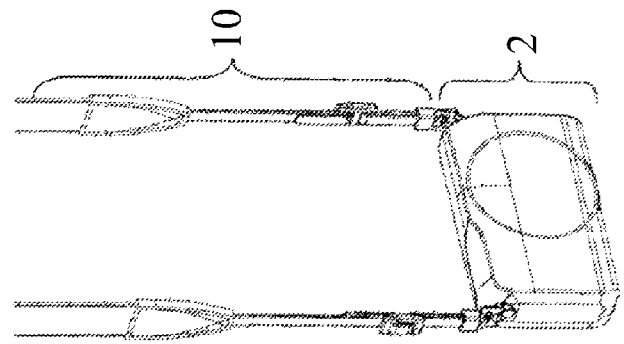

FIG. 12 is a perspective view of a strap unit of Embodiment 2. FIGS. 13A to 13D are overall views of a camera where the strap unit is attached. FIG. 13A is a perspective view, FIG. 13B is a side view, FIG. 13C is a front view, and FIG. 13D is a perspective view of the state where the strap unit rotates from the state of FIG. 13A.

In this embodiment, an attachment for strap 31 (hereafter referred to as "an attachment") where a long hole 3111 so as to insert the belt 101 is formed is used as an attachment for strap.

Figure 14A:
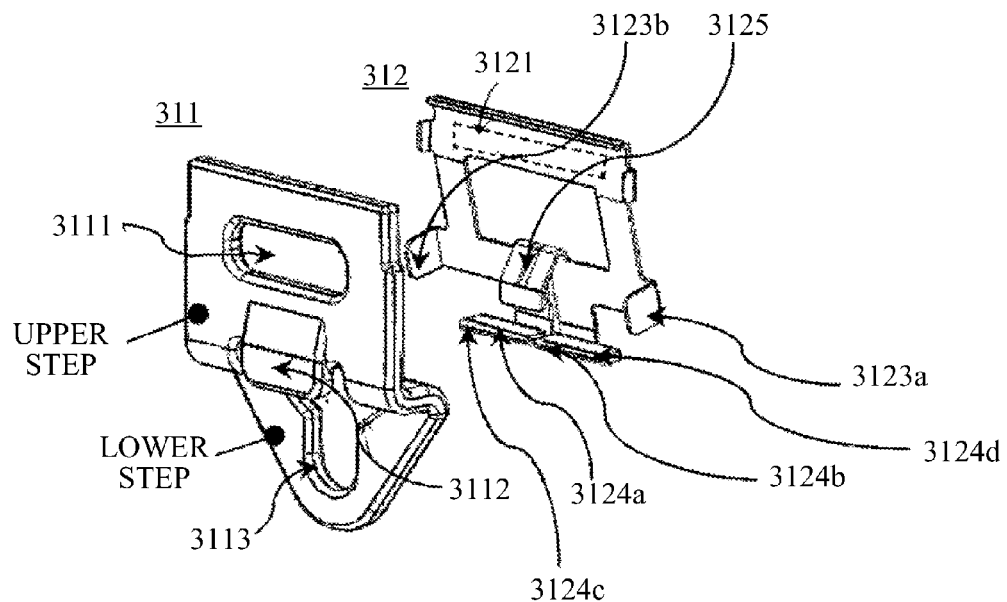
FIGS. 14A and 14B are exploded perspective views of an attachment for strap.
Figure 14B:
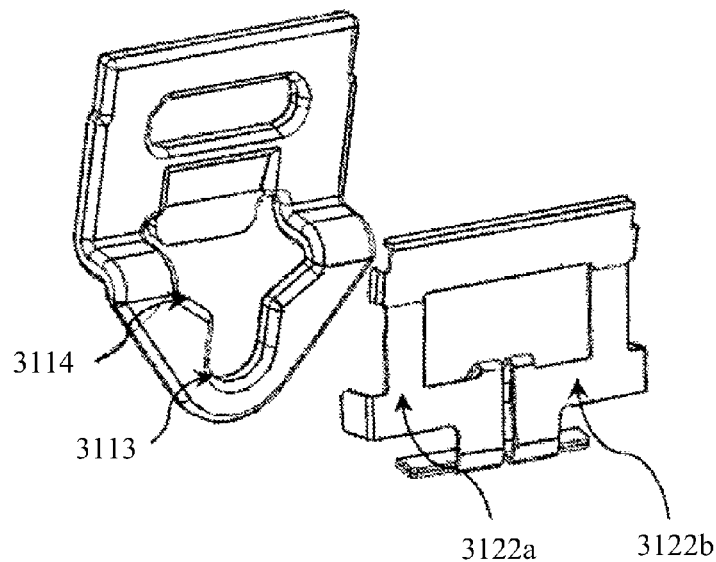
Figure 15C:
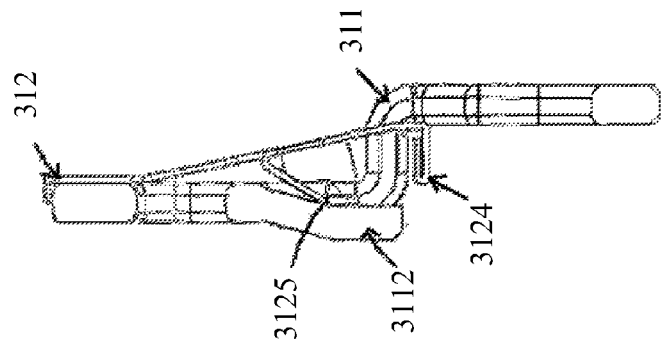
FIGS. 15A to 15C are external views of the attachment for strap.
Figure 15B:
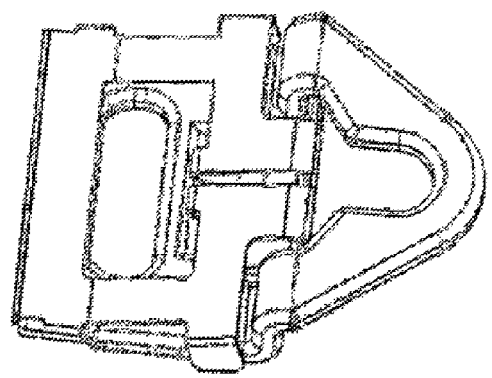
Figure 15A:
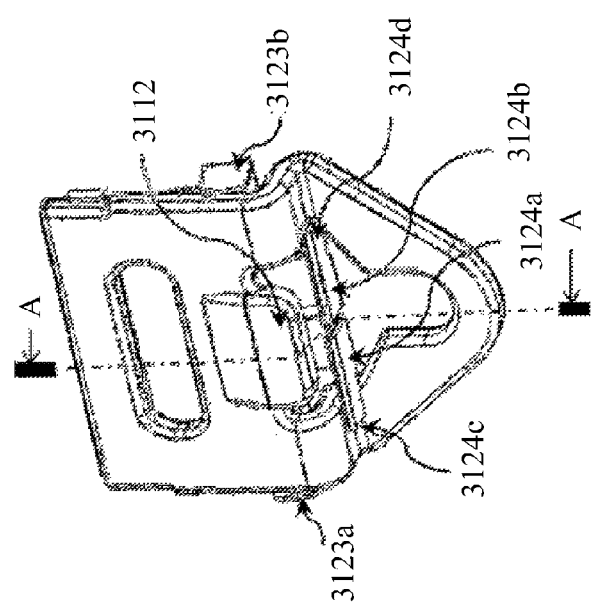

The attachment 31 is described. FIGS. 14A and 14B are perspective views of the attachment 31, FIG. 14A is a perspective view seen from a front surface side, and FIG. 14B is a perspective view seen from a back surface side. Additionally, FIGS. 15A to 15C are external views of the attachment 31, FIG. 15A is an external view seen from the front surface side, and FIG. 15B is an external view seen from the back surface side. FIG. 15C is a sectional view along A-A line of FIG. 15A.

In this embodiment, the front surface is a surface being apparent from the camera 2 when the strap unit is attached to the strap mount 20 of the camera 2, and the back surface is the opposite surface of the front surface.

The attachment 31 includes a base plate (a plate) 311 made of a metal plate such as a stainless metal and a leaf spring member 312 made of a material having elasticity. The base plate 311 and the leaf spring member 312 unite by a welding at a welding portion 3121 enclosed in a broken line of FIG. 14A.

When the base plate 311 of this embodiment is seen from the side surface, the base plate 311 is a crank shape where an upper step and a lower step thereof are parallel. In this embodiment, a lower step portion (a strap mount connecting surface) is a side closing with the camera 2 and an upper step portion (a strap hole formed surface) is a side being apart from the camera 2 when the attachment 31 is attached to the camera 2. Additionally, a cranked portion that intersects with both the upper step portion and the lower step portion and connects the upper step portion with the lower step portion is formed on the base plate 311. The cranked portion connects the upper step portion with the lower step portion so that a length from inside of the upper step portion to outside of the lower step portion is longer than a length from the seating surface 203 to the top of the head portion 201.

A long hole 3111 which is inserted the belt 101 and a protruding shape 3112 (protruding portion) are formed on the upper step portion of the base plate 311. The protruding shape 3112 is worked half blanking processing from the back surface side, the back side thereof becomes concave from surrounding surface, and the front side thereof becomes convex from surrounding surface.

A connecting hole for insertion of the strap mount 20 of the camera 2 is formed on the lower step portion of the base plate 311. The connecting hole includes a small diameter hole 3113 corresponding to the axis portion 202 of the strap mount 20 and a large diameter hole 3114 for insertion of the head portion 201. The large diameter hole 3114 connects to the small diameter hole 3113 and extends to the cranked portion.

As shown in FIG. 1, after insertion of the belt 101 into the long hole 3111 of the base plate 311, the belt 101 needs to be folded 180 degrees so as to attach the belt 101 to the base plate 311. Thus, a tumor 1010 is generated by a fold which is an attachment portion of the belt 101 around the long hole 3111. However, since the sectional view of the base plate 311 is crank shape, the tumor 1010 of a fold fits inside the scale from inside of the upper step portion to outside of the lower step portion in the base plate 311. As shown in FIG. 13D, the fold of the belt 101 does not interfere with the camera 2 even if the attachment 31 rotates 180 degrees.

Next, the shape of the leaf spring member 312 is described. The leaf spring member 312 includes the welding portion 3121 connected with the base plate 311, a pair of leaf spring portions 3122a and 3122b having elasticity, a pair of operation members 3123a and 3123b, a pair of lock portions (abutment portions) 3124a and 3124b, and an auxiliary spring portion 3125. The leaf spring member 312 is loop shape that by the welding portion 3121 connected with the base plate 311 and the top of the auxiliary spring 3125.

The pair of the leaf spring portions 3122a and 3122b are leaf spring elastically deformable, and can smoothly deform by using the welding portion 3121 which is one end of the leaf spring member 312 connected with the base plate 311 as a pivot point. By elastic deformation, the pair of the leaf spring portions 3122a and 3122b can move between the position where the strap mount 20 can be attached and the position where the strap mount 20 cannot be attached.

The pair of the operation members 3123a and 3123b are formed by bending the pair of the leaf spring portions 3122a and 3122b, respectively. The pair of the leaf spring portions 3122a and 3122b can be deformed by operating the pair of the operation members 3123a and 3123b.

The pair of the lock portions 3124a and 3124b are formed by bending each other end of the pair of the leaf spring portions 3122a and 3122b. The pair of the lock portions 3124a and 3124b are bended upward and the plate becomes two-ply by folding 180 degrees so that the pair of the lock portions 3124a and 3124b are had strong intensity. Additionally, the pair of the lock portions 3124a and 3124b have a pair of protruding portions 3124c and 3124d expanding outside.

The auxiliary spring portion 3125 is provided so as to continue with the pair of the leaf spring portions 3122a and 3122b is a leaf spring shape being thin width and having a slit so as to deform by weak load. The loop portion of the auxiliary spring portion 3125 whose top is closed contacts with the half blanking portion provided on the back side of the protruding shape 3112 of the upper step portion of the base plate 311. Therefore, when either of the pair of the operation members 3123a and 3123b is operated by pushing either of the operation members from side surface, the pair of the leaf spring portions 3122a and 3122b deform toward inside thereof. As a result, the pair of the lock portions 3124a and 3124b are prevented from overlapping each other, and the pair of the leaf spring portions 3122a and 3122b are separately operated.

In the attachment 31 of this embodiment, the leaf spring member 312 is arrange on the back side of the base plate 311 so as to fit a scale from inside of upper step portion of the base plate 311 to outside of the lower step portion in the base plate 311. Therefore, it is possible to miniaturize the attachment 31 since the base plate 311 does not receive thickness of the leaf spring member 312.

Figures 16A, 16B:
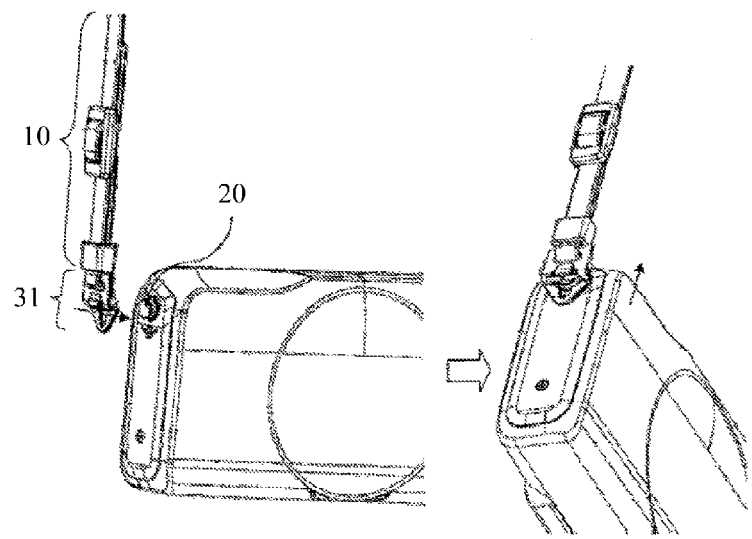
FIGS. 16A and 16B are perspective views of illustrating the camera where the strap unit is attached.
Figures 17A, 17B, 17C:
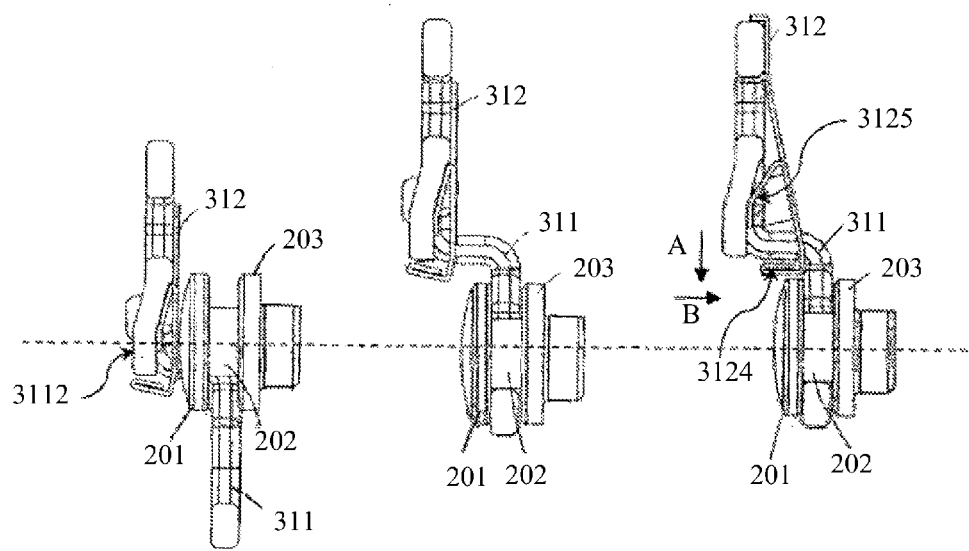
FIGS. 17A to 17C are sectional views when attaching the attachment for strap to the strap unit.

Next, the method for attaching the attachment 31 to the strap mount 20 when attaching the strap unit to the camera 2 is described. FIGS. 16A and 16B are perspective views of illustrating the camera 2 where the strap unit is attached and FIGS. 17A to 17C are sectional views when attaching the attachment 31 to the strap mount 20.

When the attachment 31 along with the strap belt 10 is attached to the camera 2, user presses the attachment 31 to the strap mount 20 shown as an arrow direction of FIG. 16A from the side of the camera 2. In the attachment 31 of FIG. 15C, the pair of the leaf spring portions 3122a and 3122b of the leaf spring member 312 is deformed by the plate portion of the head portion 201 and the head portion 201 of the strap mount 20 is passed through the large diameter hole 3114 of the base plate 311. Then, the lock portions 3124a and 3124b are positioned at the position shown in FIG. 17A (a second position) and become an unlocked state where the strap unit is able to attach the strap mount 20.

Next, the axis portion 202 of the strap mount 20 is inserted into the small diameter hole 3113 of the base plate 311 by moving the strap unit in an arrow direction shown in FIG. 16B. This state is shown in FIG. 17B.

Afterwards, the base plate 311 is clipped between the head portion 201 and the seating surface 203, and at the same time, push to the pair of the leaf spring portions 3122a and 3122b by the plate portion of the head portion 201 of the strap mount 20 is released, and attachment finish. Then, the pair of the lock portions 3124a and 3124b abut against the head portion 201 of the strap mount 20 and become the stopper of the attachment 31 by positioning at the position shown in FIG. 17C (a first position). Therefore, the strap unit becomes a locked state where the strap unit cannot detach from the strap mount 20. Additionally, the attachment 31 attached to the strap mount 20 can rotate on centering the axis of the strap mount 20 as shown in FIG. 13D.

As described above, when user operates the pair of the operation members 3123a and 3123b toward the upper step portion of the base plate 311, each of the pair of the leaf spring portions 3122a and 3122b, and the auxiliary spring portion 3125 is deformed elastically. Therefore, the pair of the lock portions 3124a and 3124b are deformed elastically toward the upper step portion of the base plate 311, and abutment of the head portion 201 of the strap mount 20 and the lock portions 3124a and 3124b is released. Then, the position relation of the attachment 31 and the strap mount 20 becomes from the state of FIG. 17C to the state of FIG. 17B, and the attachment 31 can be detached from the strap mount 20 through the state of FIG. 17A.

Here, the leaf spring member 312 of the attachment 31 is arranged on the back side of the base plate 311. When abutment of the pair of the lock portions 3124a and 3124b and the strap mount 20 is released, release operation can be performed by finger grip operation known intuitively. Therefore, the strap unit having high operability can be provided. Here, for example, if user having the camera accidentally touches the operation member, the attachment is detached from the camera by false operation of the operation member and the camera is danger of falling. Operability is decreased if the operation load increases in view of false operation.

In this embodiment, the pair of the operating member 3123a and 3123b operating the pair of the lock portions 3124a and 3124b are arranged on each left and right side and are independently operated with consideration for the above fear. Therefore, if user accidentally touches either of operation members and unintended operation is performed, either of the lock portions is only operated and the attachment 31 is not detached from the camera. Additionally, the operation load of the operation member can be decreased and the operability can be increased by the configuration of this embodiment. The operation member is provided at two points in this embodiment, but two or more operation members may be provided.

Additionally, the leaf spring member 312 of the attachment 31 is desirable to be made of thin metal easily acquiring elasticity, but a shape is fear of deforming by a little force in that case.

In this embodiment, if the attachment 31 is strongly pushed to the strap mount 20 side from the state of FIG. 17A where the attachment 31 is attached to the strap mount 20, the leaf spring member 312 abuts against the protruding portion 3112 of the base plate 311. Therefore, excessive deformation (plastic deformation) of the leaf spring member 312 is prevented.

Additionally, if the attachment 31 is strongly pushed down to A direction of figure from the state of FIG. 17C, the protruding portions 3124c and 3124d provided by expanding the lock portions 3124a and 3124b abut against the surface connecting the upper step portions with the lower step portion in the base plate 311. Therefore, excessive deformation (plastic deformation) of the leaf spring member 312 is prevented.

Additionally, if the attachment 31 is strongly pushed to B direction of figure from the state of FIG. 17C, the protruding portions 3124c and 3124d provided by expanding the lock portions 3124a and 3124b abut against the lower step portion of the base plate 311. Therefore, excessive deformation (plastic deformation) of the leaf spring member 312 is prevented.

Since the attachment 31 of this embodiment does not excessively deform by user's unintended operation, the leaf spring member 312 can be made of thin metal which easily acquires elasticity.

This embodiment is described the example where the strap is attached to the strap mount of camera, but this embodiment is applicable not only camera but also other electronic apparatus which can attach the strap and can carry.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2012-118129, filed on May 24, 2012, and 2012-118232, filed on May 24, 2012, which are hereby incorporated by reference herein in their entirety.

What is claimed is:

1. An attachment for strap comprising:
a strap mount having a head portion and an axis portion;
a plate having a strap hole formed portion, a strap mount connecting portion, and a cranked portion connecting the strap hole formed portion with the strap mount connecting portion, the cranked portion intersecting with the strap hole formed portion and the strap mount connecting portion; and
a rotating member that has an extension portion extending at one end of the rotating member and that is rotatably supported by the strap hole formed portion;
wherein a connecting hole is provided astride the strap mount connecting portion and the cranked portion so as to attach the strap mount, and
wherein the rotating member is rotatable between a first position where the extension portion passing through the connecting hole abuts against the head portion of the strap mount so as to set the attachment for strap to be in a locked state and a second position where the extension portion is removed from the connecting hole so as to set the attachment for strap in an unlocked state.

2. The attachment for strap according to claim 1,
wherein the connecting hole is provided with a small diameter hole having a diameter smaller than a diameter of the head portion and a large diameter hole that is continuously formed on the small diameter hole and that passes through the head portion, and wherein a rotation center position of the rotating member is set to a position that is shifted from a centerline connecting both center positions of the small diameter hole and the large diameter hole.

3. The attachment for strap according to claim 1, wherein the rotating member rotates in a first direction so as to rotate from the first position to the second position, and abuts against the cranked portion so as to be prevented from further rotating from the second position to the first position.

4. The attachment for strap according to claim 1, wherein the rotating member rotates in a second direction that is opposite to a first direction so as to rotate from the second position to the first position, and abuts against an end portion of the connecting hole so as to be prevented from further rotating from the first position to the second position.

5. The attachment for strap according to claim 1, further comprising:
an urging member arranged between the strap hole formed portion and the rotating member,
wherein the strap mount is attached to an electronic apparatus, and
wherein the extension portion has a protruding portion that is arranged between the head portion and the electrical apparatus at the first position so as to be urged in an attachment direction by the urging member.

* * * * *